(12) United States Patent
Parthasarathy et al.

(10) Patent No.: US 11,550,637 B2
(45) Date of Patent: Jan. 10, 2023

(54) NODE RECOVERY SOLUTION FOR COMPOSABLE AND DISAGGREGATED ENVIRONMENT

(71) Applicant: American Megatrends International, LLC, Duluth, GA (US)

(72) Inventors: Sudhakar Errappa Parthasarathy, Chennai (IN); Venkatesan Balakrishnan, Chennai (IN); Manikandan Palaniappan, Chennai (IN)

(73) Assignee: AMERICAN MEGATRENDS INTERNATIONAL, LLC, Duluth, GA (US)

( * ) Notice: Subject to any disclaimer, the term of this patent is extended or adjusted under 35 U.S.C. 154(b) by 14 days.

(21) Appl. No.: 16/804,077

(22) Filed: Feb. 28, 2020

(65) Prior Publication Data

US 2021/0271523 A1 Sep. 2, 2021

(51) Int. Cl.
*G06F 9/50* (2006.01)
*G06F 11/14* (2006.01)

(52) U.S. Cl.
CPC ............ *G06F 9/5077* (2013.01); *G06F 9/505* (2013.01); *G06F 11/1464* (2013.01); *G06F 2209/5011* (2013.01)

(58) Field of Classification Search
None
See application file for complete search history.

(56) References Cited

U.S. PATENT DOCUMENTS

| | | | | |
|---|---|---|---|---|
| 9,208,032 | B1* | 12/2015 | McAlister | H04L 41/0668 |
| 2009/0241100 | A1* | 9/2009 | Sakurai | G06F 11/1433 |
| | | | | 717/170 |
| 2015/0039930 | A1* | 2/2015 | Babashetty | G06F 11/1464 |
| | | | | 714/4.11 |
| 2016/0357610 | A1* | 12/2016 | Bartfai-Walcott | G06F 9/5027 |
| 2021/0004275 | A1* | 1/2021 | Avagyan | G06F 9/45558 |

OTHER PUBLICATIONS

Tanenbaum, "Structured Computer Organization", 1984, Prentice-Hall, 2nd Edition, pp. 10-12 (Year: 1984).*

* cited by examiner

*Primary Examiner* — Eric C Wai
(74) *Attorney, Agent, or Firm* — Locke Lord LLP; Tim Tingkang Xia, Esq.

(57) ABSTRACT

In an aspect of the disclosure, a method, a computer-readable medium, and an apparatus are provided. The apparatus may be a pod manager. The pod manager receives receive a request for composing a target composed-node. The pod manager employs a first set of pooled hardware resources of the computing pod to build the target composed-node. The pod manager determines to reserve a second set of pooled hardware resources of the computing pod for a backup node of the target composed-node. The pod manager determines that the target composed-node has failed. The pod manager employs the second set of pooled hardware resources to build the backup node.

14 Claims, 10 Drawing Sheets

NODE RECOVERY SOLUTION FOR COMPOSABLE AND DISAGGREGATED ENVIRONMENT

BACKGROUND

Field

The present disclosure relates generally to computer systems, and more particularly, to a pod manager of a computing pod that can compose a backup node of a critical node using reserved pooled resources.

Background

The statements in this section merely provide background information related to the present disclosure and may not constitute prior art.

Technological advancements in networking have enabled the rise in use of pooled and/or configurable computing resources. These pooled and/or configurable computing resources may include physical infrastructure for cloud computing networks. The physical infrastructure may include one or more computing systems having processors, memory, storage, networking, etc. Management entities of these cloud computing networks may allocate portions of pooled and/or configurable computing resources in order to place or compose a node (machine or server) to implement, execute or run a workload. Various types of applications or application workloads may utilize this allocated infrastructure in a shared manner via access to these placed or composed nodes or servers.

Failure of any critical system/node in a data center is not acceptable and it has a significant impact. In the new level of composable, disaggregated infrastructure, the nodes will be composed and disassembled on-demand. An efficient recovery solution is required to avoid failure of any nodes at any point of time.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a pod manager. The pod manager receives receive a request for composing a target composed-node. The pod manager employs a first set of pooled hardware resources of the computing pod to build the target composed-node. The pod manager determines to reserve a second set of pooled hardware resources of the computing pod for a backup node of the target composed-node. The pod manager determines that the target composed-node has failed. The pod manager employs the second set of pooled hardware resources to build the backup node.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
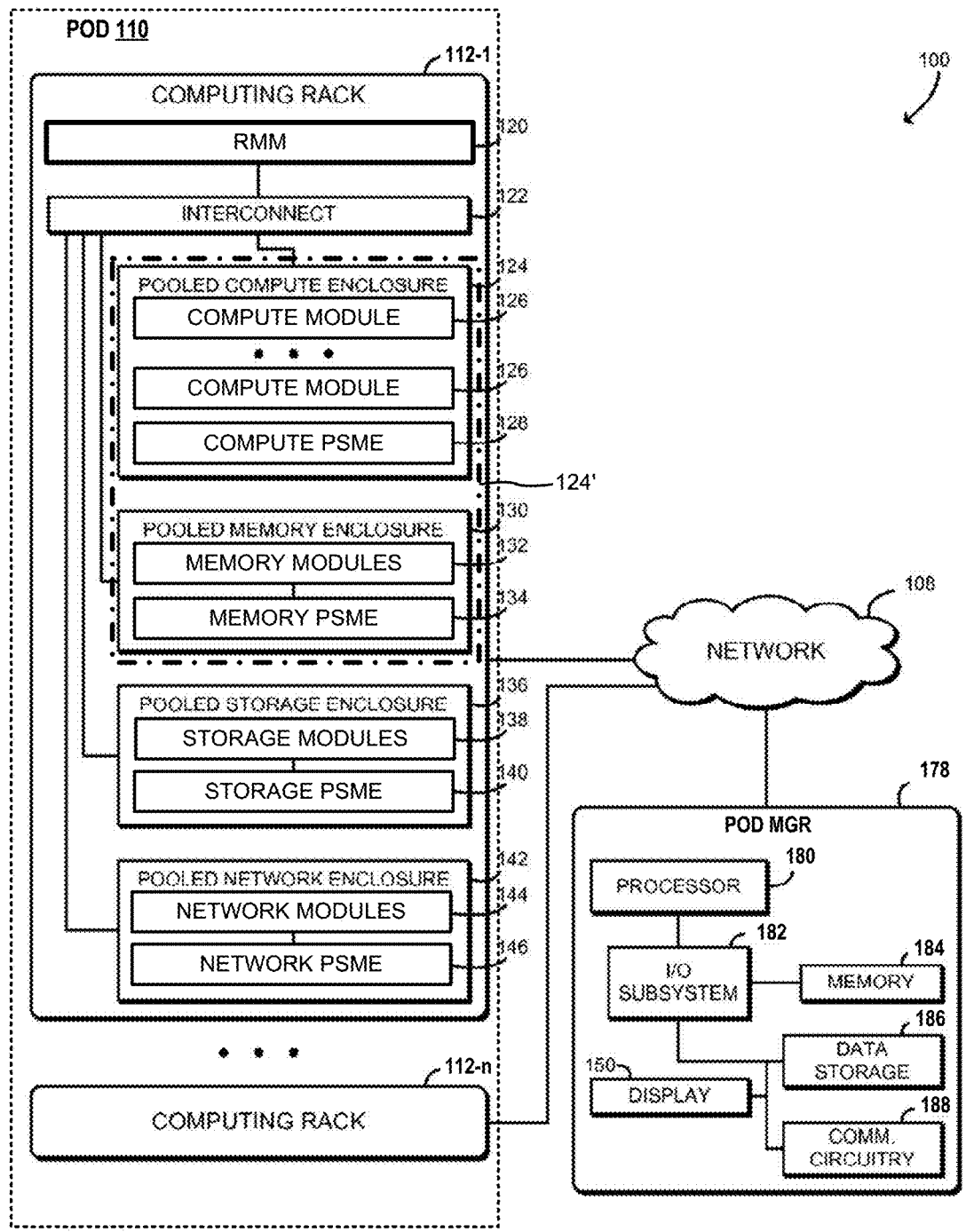
FIG. 1 is a diagram illustrating a computer system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computer systems will now be presented with reference to various apparatus and methods. These apparatus and methods will be described in the following detailed description and illustrated in the accompanying drawings by various blocks, components, circuits, processes, algorithms, etc. (collectively referred to as elements). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating a system 100 including computing racks 112-1 to 112-k and a pod manager 178 in communication over a network 108. The computing racks 112-1 to 112-k collectively constitute a computing pod 110, which is managed by the pod manager 178 as described infra. In general, a pod is a collection of computing racks within a shared infrastructure domain.

In use, computing applications or other workloads may be distributed over any number of the computing racks 112-1 to 112-k using available computing elements of the system 100 (e.g., compute nodes, memory, storage, or networking). The pod manager 178 manages resources of the system 100, for example including the current distribution and scheduling of workloads among the computing elements of the computing racks 112-1 to 112-k. The pod manager 178 can translate human input received into a number of machine-readable user-defined optimization rules. The pod manager 178 can optimize workload of the computing racks 112-1 to 112-k (e.g., optimize the placement and/or scheduling of workloads among the computing elements of the system 100) using the user-defined optimization rules well as predefined goals and constraints.

The system 100 may allow improved scheduling and placement of workload in a highly heterogeneous (e.g., disaggregated and/or modular) datacenter environment, with multiple internal (e.g., efficiency) and/or external (e.g., service delivery objective) constraints. Additionally, the system 100 may enable service providers to offer a wide range of service levels and templates to customers, due to the service provider's ability to optimally profit from all computing elements of the system 100 while managing operational cost tightly. Additionally, although described as being performed by the pod manager 178, in certain configurations some or all of those functions may be performed by other elements of the system 100, such as one or more computing racks 112-1 to 112-k.

Each of the computing racks 112-1 to 112-k may be embodied as a modular computing device that, alone or in combination with other computing racks 112-1 to 112-k, is capable of performing the functions described herein. For example, the computing rack 112-1 may be embodied as a chassis for rack-mounting modular computing units such as compute drawer/trays, storage drawer/trays, network drawer/trays, and/or traditional rack-mounted components such as servers or switches.

In this example, each of the computing racks 112-1 to 112-k may include a RMM 120 (rack management module) and one or more of an interconnect 122 coupled to a pooled compute enclosure 124, a pooled memory enclosure 130, a pooled storage enclosure 136, and a pooled network enclosure 142. The RMM 120 is responsible for managing the rack, which may include assigning IDs for pooled system management engines (PSMEs) and managing the rack power and cooling. Of course, each of the computing racks 112-1 to 112-k may include other or additional components, such as those commonly found in a server device (e.g., power distribution systems, cooling systems, or various input/output devices), in other embodiments.

In certain configurations, each of the pooled compute enclosure 124, the pooled memory enclosure 130, the pooled storage enclosure 136, and the pooled network enclosure 142 may be embodied as a tray, expansion board, or any other form factor, and may be further referred to as a "drawer." In such configurations, each enclosure/drawer may include any number of function modules or computing components, which may be allocated to an application or workload. As each of the computing racks 112-1 to 112-k includes drawers, individual components may be replaced or upgraded and may be "hot swappable." For example, in certain configurations, the pooled compute enclosure 124 may be embodied as a CPU tray including one or more compute modules 126. Each compute module 126 may include a blade having multiple processors and/or processing/controlling circuits. In such configurations, additional processing power may be added to the computing rack 112-1 by swapping out the pooled compute enclosure 124 with another pooled compute enclosure 124 including newer and/or more powerful processors.

The pooled compute enclosure 124 may be embodied as any modular computing unit such as a compute tray, expansion board, chassis, or other modular unit. As described supra, the pooled compute enclosure 124 may include one or more compute modules 126. Each compute module 126 may include a processor blade capable of performing the functions described herein. Each processor blade may include a single or multi-core processor(s), digital signal processor, microcontroller, or other processor or processing/controlling circuit. The compute modules 126 may be heterogeneous; for example, some of the compute modules 126 may be embodied as high-performance server processors and others of the compute modules 126 may be embodied as low-powered processors suitable for higher density deployment.

Further, in certain configurations, the pooled compute enclosure 124 may include a compute PSME 128. The compute PSME 128 may be embodied as any performance counter, performance monitoring unit, or other hardware monitor capable of generating, measuring, or otherwise capturing performance metrics of the compute modules 126 and/or other components of the pooled compute enclosure 124.

The pooled memory enclosure 130 may be embodied as any modular memory unit such as a memory tray, expansion board, chassis, or other modular unit. The pooled memory enclosure 130 includes memory modules 132. Each of the memory modules 132 may have a memory blade containing one or more memories capable of being partitioned, allocated, or otherwise assigned for use by one or more of the compute modules 126 of the pooled compute enclosure 124. For example, the memory blade may contain a pooled memory controller coupled to volatile or non-volatile memory, such as a large number of conventional RAM DIMMs. In operation, the pooled memory enclosure 130 may store various data and software used during operation of the computing rack 112-1 such as operating systems, virtual machine monitors, and user workloads.

Further, in certain configurations, the pooled memory enclosure 130 may include a memory PSME 134. The memory PSME 134 may be embodied as any performance counter, performance monitoring unit, or other hardware monitor capable of generating, measuring, or otherwise capturing performance metrics of the memory modules 132 and/or other components of the pooled memory enclosure 130.

In certain configurations, the computing rack 112-1 may not have a separate pooled memory enclosure 130. Rather, the pooled memory enclosure 130 may be incorporated into the pooled compute enclosure 124. As such, the computing rack 112-1 includes a combined pooled compute enclosure 124' that contains both processors and memories. In particular, in one configuration, a compute module 126 of the combined pooled compute enclosure 124' may include both processors and memories that function together. Accordingly, the compute PSME 128 manages both the processor resources and the memory resources. In another configuration, the combined pooled compute enclosure 124' may include one or more compute modules 126 as well as one or more memory modules 132.

Similarly, the pooled storage enclosure 136 may be embodied as any modular storage unit such as a storage tray, expansion board, chassis, or other modular unit. The pooled storage enclosure 136 includes storage modules 138. Each of the storage modules 138 may have a storage blade containing any type of data storage capable of being partitioned, allocated, or otherwise assigned for use by one or more of the compute modules 126 of the combined pooled compute enclosure 124'. For example, the storage blade may contain one or more memory devices and circuits, memory cards, hard disk drives, solid-state drives, or other data storage devices. Further, the storage modules 138 may be configured to store one or more operating systems to be initialized and/or executed by the computing rack 112-1.

Further, in certain configurations, the pooled storage enclosure 136 may include a storage PSME 140. The storage PSME 140 may be embodied as any performance counter, performance monitoring unit, or other hardware monitor capable of generating, measuring, or otherwise capturing performance metrics of the storage modules 138 and/or other components of the pooled storage enclosure 136.

Similarly, the pooled network enclosure 142 may be embodied as any modular network unit such as a network tray, expansion board, chassis, or other modular unit. The pooled network enclosure 142 includes network modules 144. Each of the network modules 144 may have a blade containing any communication circuit, device, or collection thereof, capable of being partitioned, allocated, or otherwise assigned for use by one or more of the compute modules 126 of the combined pooled compute enclosure 124'. For example, the network blade may contain any number of network interface ports, cards, or switches. In certain configurations, the network modules 144 may be capable of operating in a software-defined network (SDN). The network modules 144 may be configured to use any one or more communication technology (e.g., wired or wireless communications) and associated protocols (e.g., Ethernet, Bluetooth®, Wi-Fi®, WiMAX, etc.) to effect such communication.

Further, in certain configurations, the pooled network enclosure 142 may include a network PSME 146. The network PSME 146 may be embodied as any performance counter, performance monitoring unit, or other hardware monitor capable of generating, measuring, or otherwise capturing performance metrics of the network modules 144 and/or other components of the pooled network enclosure 142.

In certain configurations, the combined pooled compute enclosure 124', the pooled storage enclosure 136, and the pooled network enclosure 142 are coupled to each other and to other computing racks 112-1 to 112-k through the interconnect 122. The interconnect 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate data transfer between the computing elements of the computing rack 112-1. For example, in certain configurations, the interconnect 122 may be embodied as or include a silicon photonics switch fabric and a number of optical interconnects. Additionally or alternatively, in certain configurations, the interconnect 122 may be embodied as or include a top-of-rack switch.

The RMM 120 may be implemented by any computing node, micro-controller, or other computing device capable of performing workload management and orchestration functions for the computing rack 112-1 and otherwise performing the functions described herein. For example, the RMM 120 may be embodied as one or more computer servers, embedded computing devices, managed network devices, managed switches, or other computation devices. In certain configurations, the RMM 120 may be incorporated or otherwise combined with the interconnect 122, for example in a top-of-rack switch.

As described supra, in certain configurations, the system 100 may include a pod manager 178. A pod manager 178 is configured to provide an interface for a user to orchestrate, administer, or otherwise manage the system 100. The pod manager 178 may be embodied as any type of computation or computer device capable of performing the functions described herein, including, without limitation, a computer, a multiprocessor system, a server, a rack-mounted server, a blade server, a laptop computer, a notebook computer, a tablet computer, a wearable computing device, a network appliance, a web appliance, a distributed computing system, a processor-based system, and/or a consumer electronic device. In certain configurations, the pod manager 178 may be embodied as a distributed system, for example with some or all computational functions performed by the computing racks 112-1 to 112-k and with user interface functions performed by the pod manager 178. Accordingly, although the pod manager 178 is illustrated in FIG. 1 as embodied as a single server computing device, it should be appreciated that the pod manager 178 may be embodied as multiple devices cooperating together to facilitate the functionality described infra. As shown in FIG. 1, the pod manager 178 illustratively includes a processor 180, an input/output subsystem 182, a memory 184, a data storage device 186, and communication circuitry 188. Of course, the pod manager 178 may include other or additional components, such as those commonly found in a workstation (e.g., various input/output devices), in other embodiments. Additionally, in certain configurations, one or more of the illustrative components may be incorporated in, or otherwise form a portion of, another component. For example, the memory 184, or portions thereof, may be incorporated in the processor 180 in certain configurations.

The processor 180 may be embodied as any type of processor capable of performing the functions described herein. The processor 180 may be embodied as a single or multi-core processor(s), digital signal processor, micro-controller, or other processor or processing/controlling circuit. Similarly, the memory 184 may be embodied as any type of volatile or non-volatile memory or data storage capable of performing the functions described herein. In operation, the memory 184 may store various data and software used during operation of the pod manager 178 such as operating systems, applications, programs, libraries, and drivers. The memory 184 is communicatively coupled to the processor 180 via the I/O subsystem 182, which may be embodied as circuitry and/or components to facilitate input/output operations with the processor 180, the memory 184, and other components of the pod manager 178. For example, the I/O subsystem 182 may be embodied as, or otherwise include, memory controller hubs, input/output control hubs, integrated sensor hubs, firmware devices, communication links (i.e., point-to-point links, bus links, wires, cables, light guides, printed circuit board traces, etc.) and/or other components and subsystems to facilitate the input/output operations. In certain configurations, the I/O subsystem 182 may form a portion of a system-on-a-chip (SoC) and be incorporated, along with the processor 180, the memory 184, and other components of the pod manager 178, on a single integrated circuit chip.

The data storage device 186 may be embodied as any type of device or devices configured for short-term or long-term storage of data such as, for example, memory devices and circuits, memory cards, hard disk drives, solid-state drives, or other data storage devices. The communication circuitry 188 of the pod manager 178 may be embodied as any communication circuit, device, or collection thereof, capable of enabling communications between the pod manager 178, the computing racks 112-1 to 112-$k$, and/or other remote devices over the network 108. The communication circuitry 188 may be configured to use any one or more communication technology (e.g., wired or wireless communications) and associated protocols (e.g., Ethernet, Bluetooth®, Wi-Fi®, WiMAX, etc.) to effect such communication.

The pod manager 178 further includes a display 190. The display 190 of the pod manager 178 may be embodied as any type of display capable of displaying digital information such as a liquid crystal display (LCD), a light emitting diode (LED), a plasma display, a cathode ray tube (CRT), or other type of display device. As further described below, the display 190 may present an interactive graphical user interface for management of the system 100.

As described infra, the computing racks 112-1 to 112-$k$ and the pod manager 178 may be configured to transmit and receive data with each other and/or other devices of the system 100 over the network 108. The network 108 may be embodied as any number of various wired and/or wireless networks. For example, the network 108 may be embodied as, or otherwise include, a wired or wireless local area network (LAN), a wired or wireless wide area network (WAN), a cellular network, and/or a publicly-accessible, global network such as the Internet. As such, the network 108 may include any number of additional devices, such as additional computers, routers, and switches, to facilitate communications among the devices of the system 100.

Although each of the computing racks 112-1 to 112-$k$ has been illustrated as including a single combined pooled compute enclosure 124', a single pooled storage enclosure 136, and a single pooled network enclosure 142, it should be understood that each of the computing racks 112-1 to 112-$k$ may include any number and/or combination of those modular enclosures.

Figure 2:
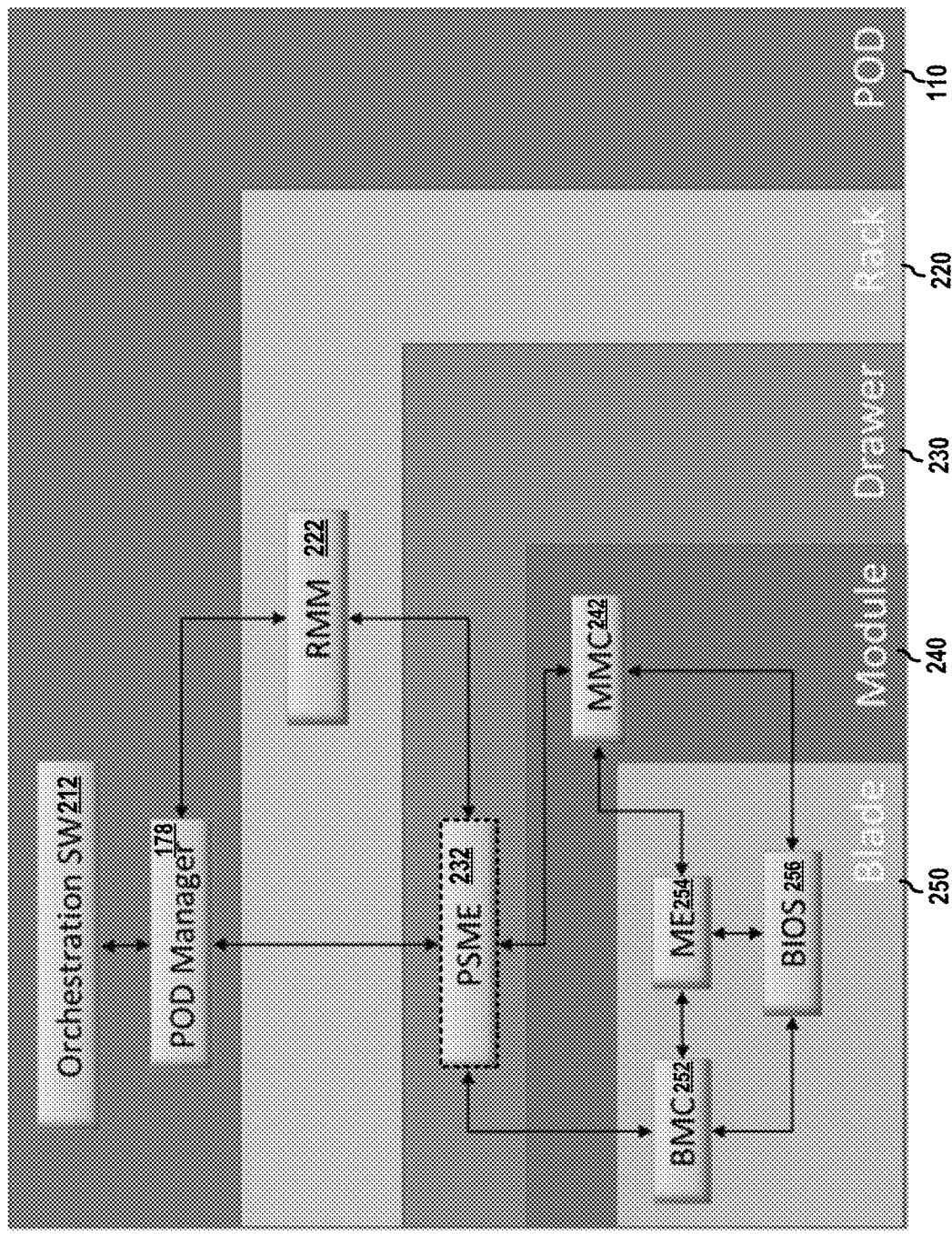
FIG. 2 is a diagram illustrating a logical hierarchy of a computer system.

FIG. 2 is a diagram 200 illustrating a logical hierarchy of the system 100. As described supra, the pod manager 178 manages the computing pod 110. An orchestration module 212 may send a request to the pod manager 178 for a composed-node. Accordingly, the pod manager 178 may allocate resources of the computing pod 110 to build the requested composed-node. A composed-node may include resources from compute, memory, network, and storage modules.

Further, as shown, the computing pod 110 includes at least one computing rack 220. Each computing rack 220, which may be any one of the computing racks 112-1 to 112-$k$, includes a RMM 222 (e.g., the RMM 120). The computing rack 220 also includes at least one computing drawer 230, each of which may be any one of the combined pooled compute enclosure 124', the pooled storage enclosure 136, and the pooled network enclosure 142. In certain configurations, each computing drawer 230 may include a PSME 232, which may be any corresponding one of the compute PSME 128, the memory PSME 134, the storage PSME 140, and the network PSME 146.

The computing drawer 230 also includes at least one module 240, which may be any corresponding one of the compute module 126, the memory module 132, the storage module 138, and the network module 144. Each module 240 includes a MMC 242 (module management controller) that services the module 240 and manages the blades in the module 240.

Each module 240 also includes at least one computing blade 250. Each computing blade 250 includes a BMC 252 (baseboard management controller), a ME 254 (management engine), and a BIOS 256 (Basic Input/Output System). The PSME 232 is in communication with the MMC 242 and the BMC 252. The BMC 252 is in communication with the BIOS 256 and the ME 254.

In particular, the pod manager 178 is responsible for discovery of resources in the computing pod 110, configuring the resources, power and reset control, power management, fault management, monitoring the resources usage. The pod manager 178 interacts with the RMM 120 and the PSME 232 to create representation of the computing pod 110. The pod manager 178 allows composing a physical node to match the logical node requirements specified by the solution stack. Such composition is able to specify a system at a sub-composed node granularity.

The pod manager 178 may be connected to the RMM 222 and the PSME 232 through the network 108 (e.g., a private network). A management related activity such as reconfiguration may be performed after establishing a secure communication channel between the pod manager 178 and the PSME 232 and between the pod manager 178 and the RMM 222.

The RMM 222 may be responsible for handling infrastructure functions of the computing rack 220 such as power, cooling, and assigning PSME IDs. The RMM 222 may also support power monitoring at rack level. This feature helps the pod manager 178 take actions to keep the rack within its power budget.

As described supra, the computing rack 220 is made-up of drawers such as the computing drawer 230. The computing rack 220 provides a mechanism to manage rack level end point components down to the drawer level. In particular, the PSME 232 provides management interface to manage the modules/blades (e.g., the module 240/the computing blade 250) at a drawer level. In certain configurations, the PSME 232 may service multiple drawers, as long as the drawer is uniquely addressable and provides the necessary instrumentation. For example, if each drawer has a microcontroller to provide the necessary instrumentation for all drawer requirements (such as module presence detection) and is interfaced to the RMM 222, then the PSME 232 could physically run in the RMM 222 and represent each drawer instance.

In certain configurations, the PSME 232 may be responsible for drawer identification management and for communicating with the BMC 252 and the MMC 242 perform node-level management. If the RMM 222 is not present in the computing rack 220, the PSME 232 in the computing rack 220 would provide the RMM functionality. The PSME 232 may also provide individual node reset support including power on and power off of the drawer and modules (e.g., the module 240 and the computing blade 250) that are managed by the PSME 232.

Figure 3:
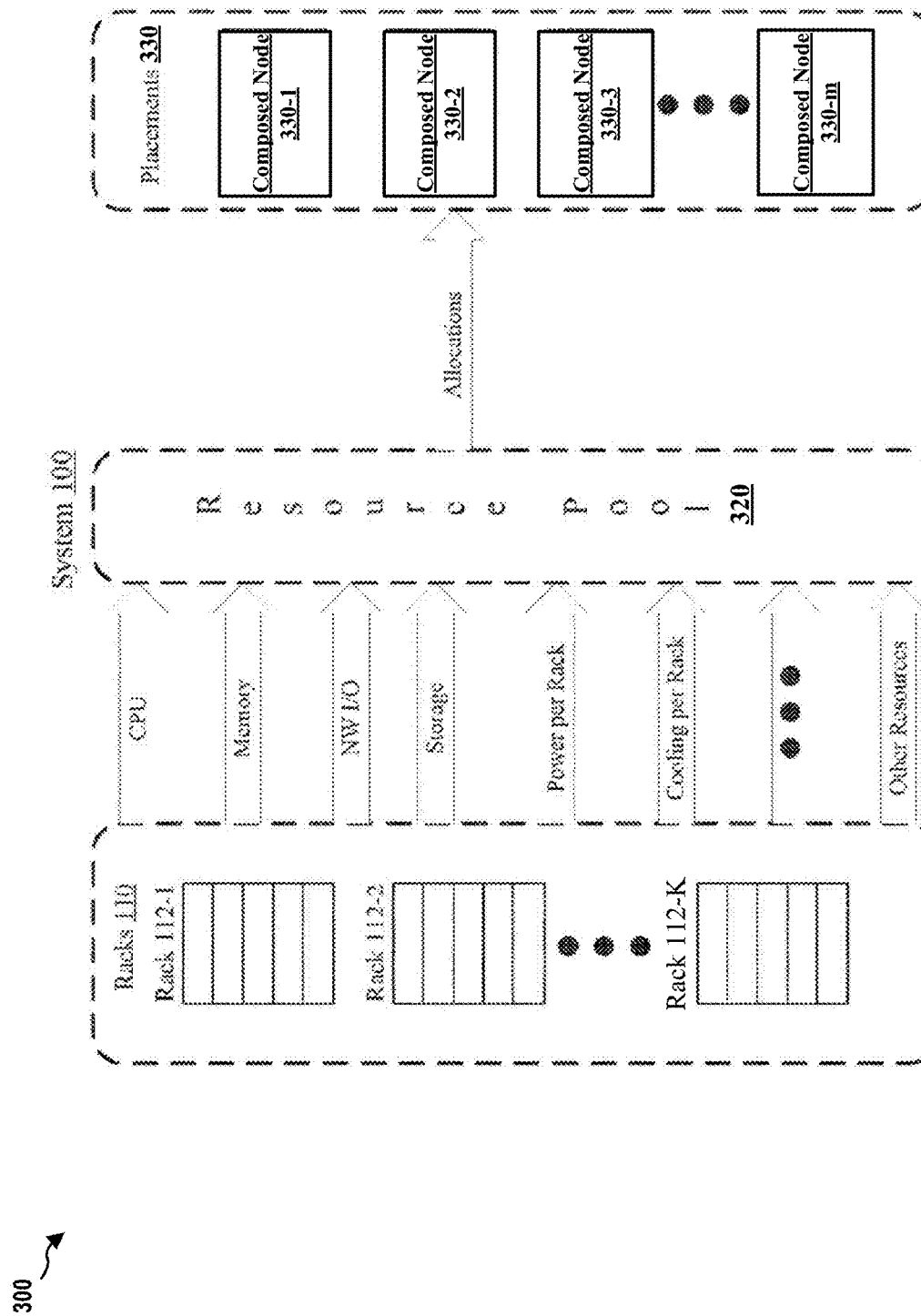
FIG. 3 is a diagram illustrating allocation of resources of a computer system.

FIG. 3 is a diagram 300 illustrating allocation of resources of the system 100. In certain configurations, as described supra, machines (or servers) can be logically composed from pools of disaggregated physical elements of the system 100 to implement or execute incoming workload requests. These composed-nodes may be deployed in large data centers. The composed-nodes may also be part of software defined infrastructure (SDI). SDI-enabled data centers may include dynamically composed-nodes to implement or execute workloads.

As described supra, the system 100 may include the computing racks 112-1 to 112-k, where k is a positive integer. Each rack may include various configurable computing resources. These configurable computing resources may include various types of disaggregated physical elements. Types of disaggregated physical elements may include, but are not limited to, CPU types (e.g., the compute modules 126), memory types (e.g., the memory modules 132), storage types (e.g., the storage modules 138), network I/O types (e.g., the network modules 144), power types (e.g., power bricks), cooling types (e.g., fans or coolant) or other types of resources (e.g., network switch types). These configurable computing resources may be made available (e.g., to a resource manager or controller) in a resource pool 320.

In certain configurations, various configurable computing resources of the system 100 may be made available in the resource pool 320 for allocation to build a composed-node. A composed-node, for example, may be composed to implement or execute a workload. At least a portion (e.g., a configuration) of available configurable computing resources in the resource pool may be allocated to support placements 330. As shown in FIG. 3, placements 330 include composed-nodes 332-1 to 332-m, where "m" is any positive integer.

As described infra, certain logic and/or features of the system 100 may also be capable of monitoring operating attributes for each configurable computing resource allocated to compose or place a composed-node while the composed-node implements, runs or executes a workload.

According to some examples, each of the composed-nodes 332-1 to 332-m may be used to run one or more virtual machines (VMs). For these examples, each of the one or VMs may be allocated a portion of a composed-node (i.e., allocated configurable computing resources). In other examples, a composed-node may be allocated directly to a given VM.

Figure 4:
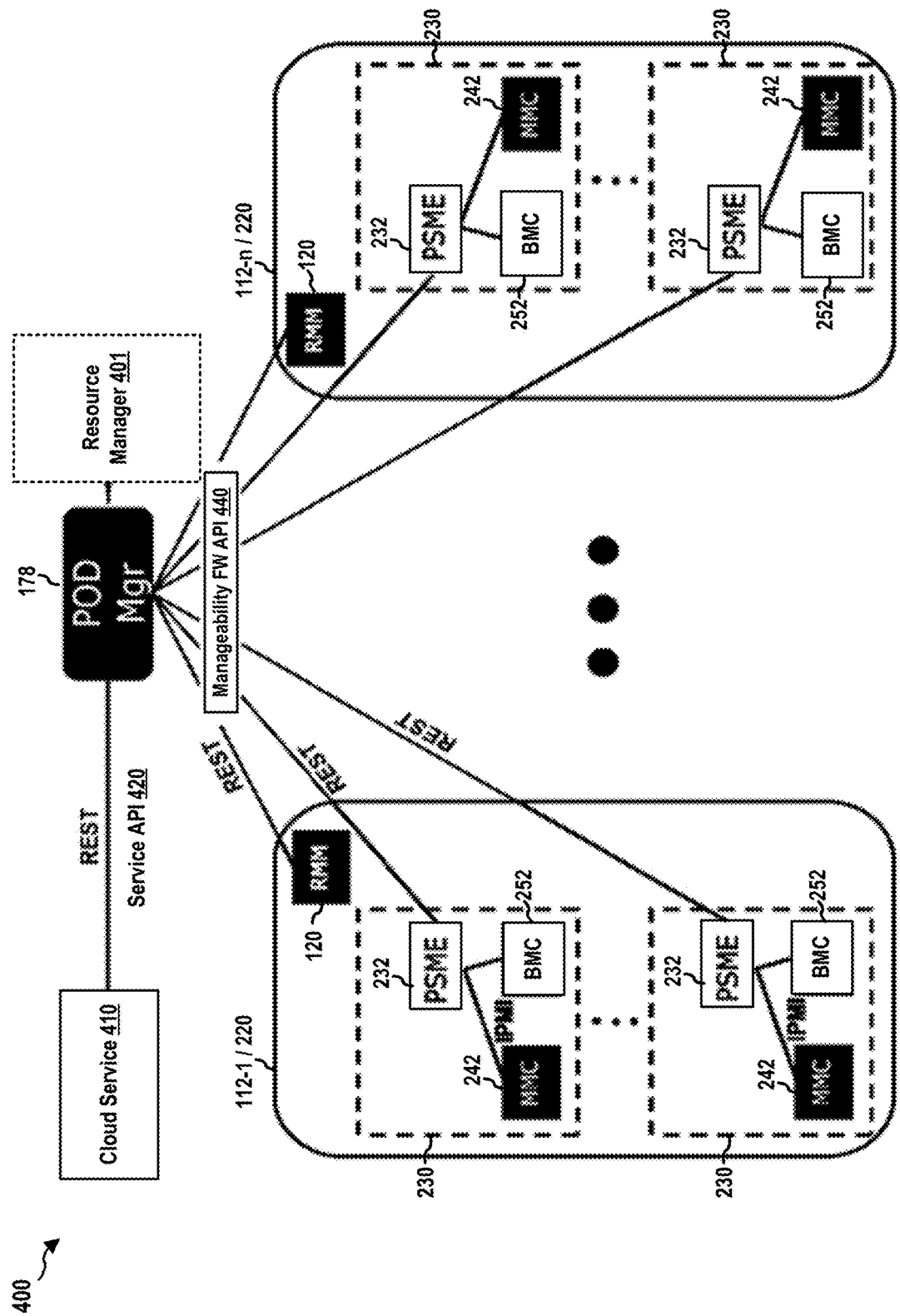
FIG. 4 is a diagram illustrating a rack management structure of a computer system.

FIG. 4 is a diagram illustrating a rack management structure 400 of the system 100. In some examples, as shown in FIG. 4, the rack management structure 400 includes various managers and application programing interfaces (APIs). For example, a cloud service 410 may interface through a service API 420 (e.g., orchestration interface) as a common service application interface (API) to communicate with the pod manager 178. The pod manager 178 manages the computing racks 112-1 to 112-k including various types of disaggregated physical elements (e.g., the computing drawer 230).

In certain configurations, the pod manager 178 may include a resource manager 401 that includes logic and/or features capable of allocating these disaggregated physical elements (e.g., the compute modules 126, the memory modules 132, the storage modules 138, the network modules 144) responsive to a request from a cloud service 410 to allocate configurable computing resources to a composed-node to implement or execute a workload that may be associated with the cloud service 410. The workload, for example, may be an application workload such as, but not limited to, video processing, encryption/decryption, a web server, content delivery or a database. The resource manager 401 may maintain a resource catalog to track what configurable computing resources have been allocated and also what configurable computing resources may be available to allocation responsive to subsequent requests from the cloud service 410.

In certain configurations, the pod manager 178 may utilize a manageability FW API 440 (firmware), which is a Representational State Transfer (REST)-based API, to access to the configurable computing resources at the computing racks 112-1 to 112-k. This access may include access to disaggregated physical elements maintained at racks as well as metadata for technologies deployed in these racks that may include gathered operating attributes for these disaggregated physical elements. In particular, the manageability FW API 440 provides access to the RMM 120 and the PSME 232 (e.g., the compute PSME 128, the memory PSME 134, the storage PSME 140, and the network PSME 146) of each computing drawer 230 in the computing racks 112-1 to 112-k.

REST-based or RESTful Web services are one way of providing interoperability between computer systems on the Internet. REST-compliant Web services allow requesting systems to access and manipulate textual representations of Web resources using a uniform and predefined set of stateless operations. In a RESTful Web service, requests made to a resource's URI will elicit a response that may be in XML, HTML, JSON or some other defined format. The response may confirm that some alteration has been made to the stored resource, and it may provide hypertext links to other related resources or collections of resources. Using HTTP, as is most common, the kind of operations available include those predefined by the HTTP verbs GET, POST, PUT, DELETE and so on. By making use of a stateless protocol and standard operations, REST systems aim for fast performance, reliability, and the ability to grow, by re-using components that can be managed and updated without affecting the system as a whole, even while it is running.

In certain configurations, the RMM 120 may also provide access to the physical and logical asset landscapes or mapping in order to expedite identification of available assets and allocate configurable computing resources responsive to requests to compose or place a composed-node to implement or execute a workload.

In certain configurations, the RMM 120 may provide a rack level user interface in order to fulfill several basic functions, such as discovery, reservation, polling, monitoring, scheduling and usage. Also, the RMM 120 may be utilized for assembly of higher order computing resources in a multi-rack architecture (e.g., to execute a workload).

In certain configurations, the RMM 120 may report assets under its management to the pod manager 178 that includes the resource manager 401. For these examples, resource manager 401 may include logic and/or features capable of assisting the pod manager 178 in aggregating an overall physical asset landscape structure from all racks included in the pod of racks managed by the pod manager 178 into a single multi-rack asset. According to some examples, the RMM 120 may also receive and/or respond to requests from the pod manager 178 via the manageability FW API 440 (i.e., a REST API).

According to some examples, the pod manager 178 may receive a request to allocate a portion of the configurable computing resources maintained in the computing racks 112-1 to 112-$k$. For these examples, the pod manager 178 may receive the request through the service API 420 in a standardized protocol format such as the Open Virtualization Format (OVF). OVF may include hints (e.g., metadata) of a type of workload. The pod manager 178 may be capable of determining what hardware configuration may be needed to place or compose a composed-node to implement or execute the workload. The pod manager 178 may then forward the request and indicate the hardware configuration possibly needed to the resource manager 401. For example, a configuration of configurable computing resources including various types of disaggregate physical elements such as CPUs, memory, storage and NW I/O needed to implement, run, or execute the workload. The pod manager 178 may discover and communicate with the RMM 222 of each computing rack 220 and the PSME 232 of each computing drawer 230.

The BMC 252 may support Intelligent Platform Management Interface standard (IPMI). IPMI is an industry standard and is described in, e.g., "IPMI: Intelligent Platform Management Interface Specification, Second Generation, v.2.0, Feb. 12, 2004," which is incorporated herein by reference in its entirety. IPMI defines a protocol, requirements and guidelines for implementing a management solution for server-class computer systems. The features provided by the IPMI standard include power management, system event logging, environmental health monitoring using various sensors, watchdog timers, field replaceable unit information, in-band and out of band access to the management controller, simple network management protocol (SNMP) traps, etc. The BMC 252 may be in communication with the computing blade 250 and may manage the computing blade 250.

Further, the PSME 232 may include REST services. The pod manager 178 may access the REST services through the manageability FW API 440. The REST services provide the REST-based interface that allows full management of the PSME 232, including asset discovery and configuration. For example, the REST services may be a REDFISH® server. REDFISH® is an open industry standard specification and schema that specifies a RESTful interface and utilizes JSON and OData for the management of scale-out computing servers and for accessing data defined in model format to perform out-of-band systems management. The REST services may support some or all of the requirements of "Redfish Scalable Platforms Management API Specification, Version: 1.0.0, Document Identifier: DSP0266, Date: 2015 Aug. 4," which is incorporated herein in its entirety by reference.

When the computing drawer 230 is a compute drawer, the PSME 232 may provide to the pod manager 178 information of and functions to operate on a processor collection resource, which provides collection of all processors available in a blade.

When the computing drawer 230 is a memory drawer or a compute drawer including a memory), the PSME 232 may provide to the pod manager 178 information of and functions to operate on a memory collection resource, which provides collection of all memory modules installed in a computer system. The PSME 232 may also provide information of and functions to operate on a memory chunks collection resource, which provides collection of all memory chunks in a computer system. The PSME 232 may further provide to the pod manager 178 information of and functions to operate on a storage adapters collection resource, which provides collection of all storage adapters available in a blade. The PSME 232 may also provide to the pod manager 178 information of and functions to operate on a storage adapter resource, which provides detailed information about a single storage adapter identified by adapter ID. The PSME 232 may provide to the pod manager 178 information of and functions to operate on a storage device collection resource, which provides collection of all storage devices available in a storage adapter. The PSME 232 may also provide to the pod manager 178 information of and functions to operate on a device resource, which provides detailed information about a single storage device identified by device ID.

When the computing drawer 230 is a networking drawer, the PSME 232 may provide to the pod manager 178 information of and functions to operate on a Blade Network Interface resource, which provides detailed information about a network interface identified by NIC ID.

In addition, the PSME 232 may provide to the pod manager 178 information of and functions to operate on a manager collection resource, which provides collection of all managers available in the computing drawer 230. The PSME 232 may provide to the pod manager 178 information of and functions to operate on chassis collection resource, a chassis resource. a computer systems collection, and a computer system resource, The PSME 232 may provide to the pod manager 178 information of and functions to operate on one or more of the following: a manager resource that provides detailed information about a manager identified by manager ID; a switch collection resource that provides collection of all switches available in a fabric module; a switch resource that provides detailed information about a switch identified by switch ID; a switch port collection resource that provides collection of all switch port available in a switch; a switch port resource that provides detailed information about a switch port identified by port ID; a switch ACL collection resource that provides collection of all Access Control List (ACL) defined on switch; a switch ACL resource that provides detailed information about a switch Access Control List defined on switch; a switch ACL rule collection resource that provides collection of all rules for Access Control List (ACL) defined on switch; a switch ACL rule resource that provides detailed information about a switch ACL rule defined identified by rule ID; a switch port static MAC collection resource that provides collection of all static MAC forwarding table entries; a switch port static MAC resource that provides detailed information about a static MAC address forward table entry; a network protocol resource that provides detailed information about all networks services supported by a manager identified by manager ID; a Ethernet interface collection resource that provides collection of all Ethernet interfaces supported by a manager identified by manager ID or included in a blade identified by blade ID; a Ethernet interface resource that provides detailed information about a Ethernet interface identified by NIC ID; a VLAN Network Interface collection resource that provides collection of all VLAN network interfaces existing on a switch port identified by port ID or network interface identified by NIC ID; a VLAN Network Interface resource that provides detailed information about a VLAN network interface identified by VLAN ID; an event service resource responsible for sending events to subscribers; an event subscription collection, which is a collection of Event Destination resources; an event subscription contains information about type of events user subscribed for and should be sent; and a definition of event array that is POST-ed by Event Service to active subscribers, event array representing the properties for the events themselves and not subscriptions or any other resource, each event in this array having a set of properties that describe the event.

The present disclosure is directed to techniques of avoiding or reducing failure of any node at any point of time by reservation of resources and with the intelligence introduced to the management application to make available at all critical situation.

Certain data center infrastructures aggressively transforming themselves in how the infrastructure is provisioned and managed. The new level of scale, automation and flexibility can be effectively delivered via composable/disaggregated infrastructure as described supra (e.g., computing pod), which brings together compute, storage and networking elements.

The new nodes or computation resources which can run will be provisioned or allocated and provided dynamically on demand from the available pool of resources by a high-level management software. The resources will be pulled from the pool for a new node, if the resources are freely available or not associated to any already provisioned nodes. If the resources are not available within the rack of resources while a new node is requested, then a new node cannot be created at any critical time if an already composed node encounters problems.

The top-level management software has the ability to monitor, manage, and control the pool of resources of all racks which are available in the infrastructure. The resources availability validation and the new node composition is achieved through the top-level management software application, in response to requests from users.

The rack resources can be reserved in advance for critical nodes and can ensure the resources availability all the time for new node composition dynamically at critical times to avoid a Single-Point-Of-Failure (SPOF) situation. This can be achieved by the management software with the intelligence provided to reserve and use the reserved resources at critical situations.

The resources can be reserved for critical node composition and will be used when any critical node fails to function. The management software can create/compose a new node and assign the failed node roles. The amount of resource reservation will be based on the number of critical nodes in the rack and based on the node failure rate from the historical data.

In certain configurations, as only the computation resources are critical in a composable infrastructure, the reservation may be utilized for computation resources. Storage resources in a Composable and Disaggregated Infrastructure (CDI) environment may be shared and can be implemented with other recovery solutions. The recovery or backup solution can be incorporated as part of Rack Scale Design (RSD) solution itself.

The management software can be implemented with the intelligence to do an optimum rack utilization by moving the nodes across the racks. This will help to identify the low utilization of racks can be consolidated and improve utilization and reduce power consumption. As the top-level management software can control all the racks of overall infrastructure, the reservation can be done with the same rack or also across the racks, which can be globally distributed.

Figure 5:
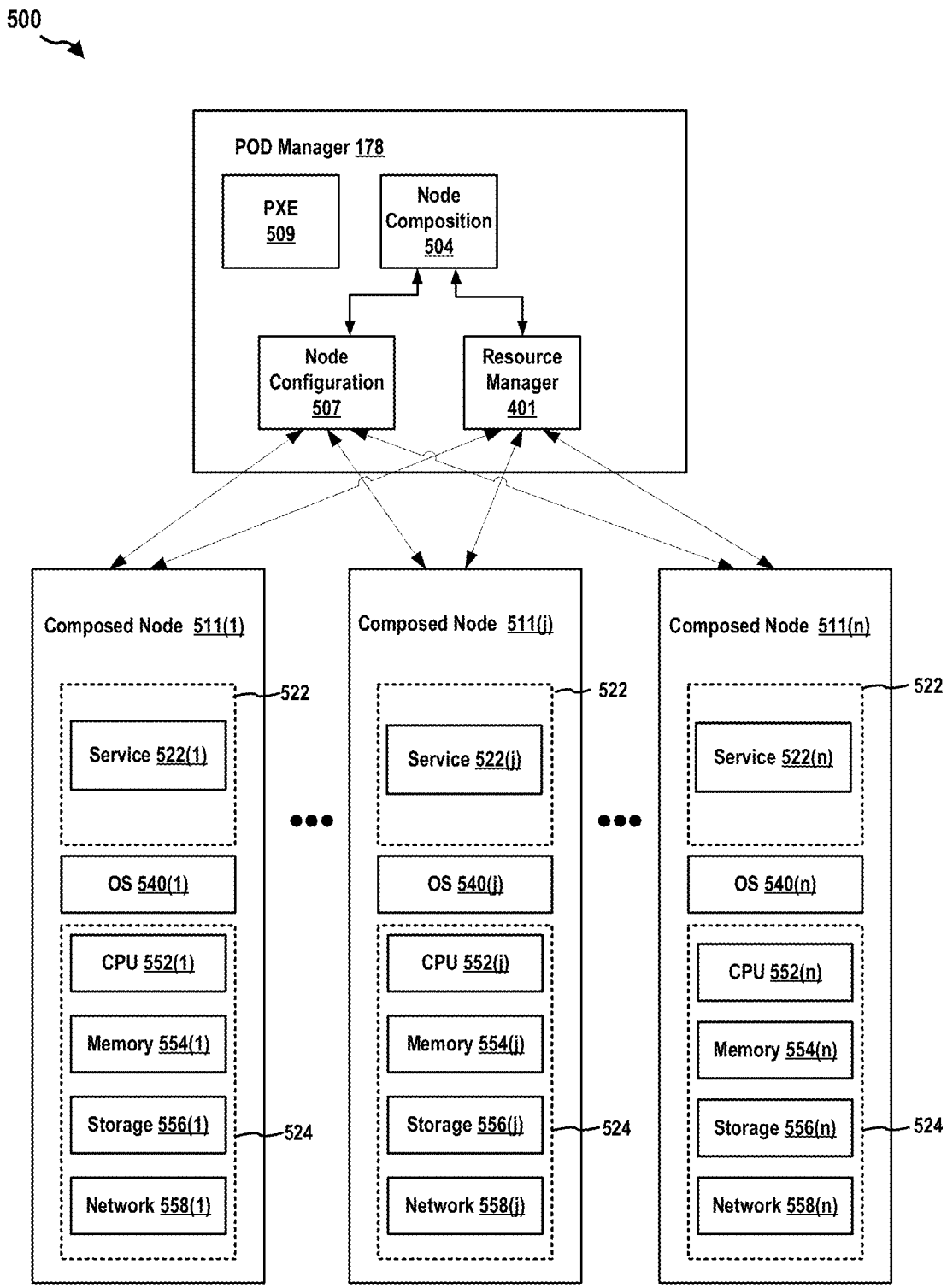
FIG. 5 is diagram illustrating a pod manager managing multiple composed-nodes.

FIG. 5 is diagram 500 illustrating a pod manager managing multiple composed-nodes. The pod manager 178 includes, among other components, a resource manager 401, a node-composing component 504, and a node configuration component 507, and a PXE server 509 (Preboot Execution Environment server).

The node-composing component 504 may provide an interface (e.g., a user interface, an application program interface (API), etc.) through which a user or a computing device (i.e., a requester) can request the node-composing component 504 to compose a target composed-node and inform the node-composing component 504 requirements for the target composed-node. The requirements may indicate the type of composed-node needed (e.g., a compute composed-node, a storage composed-node, a network composed-node, etc.), the computing powers required, the memory capacity, the storage capacity, the network throughput, etc.

Based on the requirements, the node-composing component 504 may select a target data-object template for constructing a node that satisfies the requirements. The data-object template defines the parameters for composing a node. For example, a data-object template may specify the model, number, capacity/speed of the processors, memories, disk drives, and network interfaces.

After selecting the target data-object template, the node-composing component 504 generates a data object based on the target data-object template. The data object is specific to the resource manager 401 for creating a particular composed-node satisfying the requirements of the requester. Subsequently, the node-composing component 504 sends the generated data object to the resource manager 401. The resource manager 401 then, according to the data object, communicates with the computing racks 112-1 to 112-k to allocate resources from the resource pool 320 and to build the target composed-node.

Figure 6:
FIG. 6 shows an exemplary data object.

FIG. 6 shows an exemplary data object 600 in JSON format. The node-composing component 504 may construct the data object 600. The node-composing component 504 may send the data object 600 to the resource manager 401, requesting the resource manager 401 to accordingly build a requested composed-node. The requirements described in the data object 600 may be treated by the resource manager 401 as a minimal required value, so the resulting composed-node may have better parameters than requested. In this example, as shown in FIG. 6, the requested name for the composed-node is "Node1." The requested description of the composed-node is "Node for MegaRAC." Regarding the requested processors, the model is "Multi-Core Intel® Xeon® processor 7xxx Series." The requested number of cores of a processor is 8. The requested achievable speed of a processor is 3700 MHz. The requested brand is "E5" Regarding the requested memory, the requested capacity is 16384 MiB. The requested data width bits are 64. The requested memory device type is DDR4. Regarding the requested local drives, the requested capacity is 300 GiB.

Referring back to FIG. 5, as described supra, the node-composing component 504 receives the requirements for a target composed-node (e.g., through the interface provided by the node-composing component 504) from a requester such as a user or another computing device. In addition to what was described supra, the requirements may also include an indication of an application or functionality (e.g., a database server) of the target composed-node. Based on this indication, the node-composing component 504 may select a corresponding data-object template and generate a corresponding data object that specifies one or more service components to be installed on the target composed-node for implementing the requested application or functionality.

In this example, the resource manager 401, based on the data object received from the node-composing component 504, uses the resource of the computing racks 112-1 to 112-k to build a composed-node 511(1), which may be one of the composed-nodes 332-1 to 332-m. The resource manager 401 may further load a boot agent on the composed-node 511(1). The boot agent is configured to download an OS 540(1) and a service component 522(1) from the PXE server 509 and to install the OS 540(1) and the service component 522(1) on the composed-node 511(1). More specifically, the service component 522(1) is installed on the OS 540(1) to implement the application or functionality of the target composed-node. In this example, the OS 540(1) may be a LINUX® OS and the service component 522(1) may be a MYSQL® database.

Figure 7:
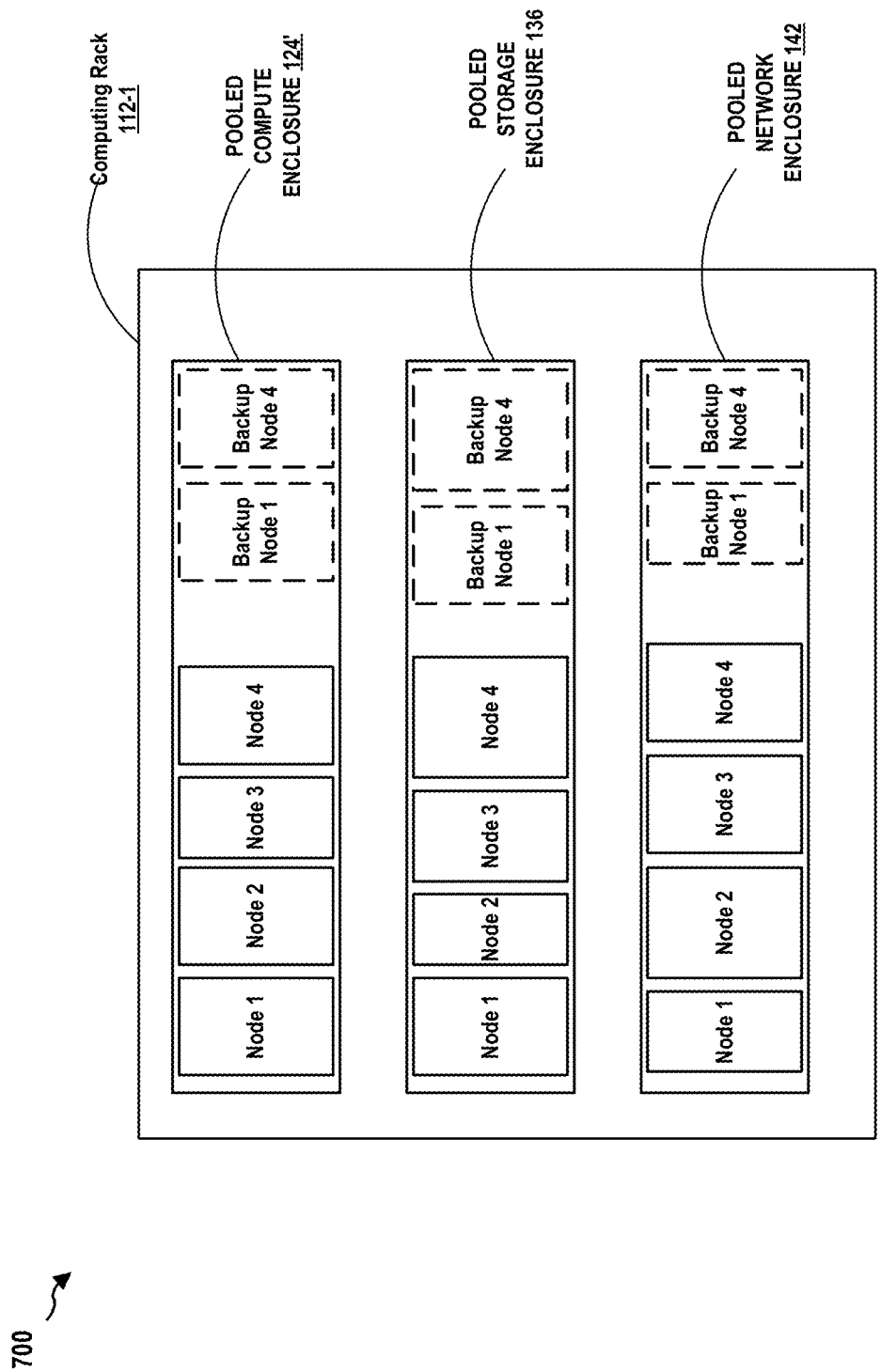
FIG. 7 is a diagram illustrating a node recovery technique.

FIG. 7 is a diagram illustrating a node recovery technique. In this example, the node-composing component 504 may, in response to a received request, composes nodes 1, 2, 3, 4 using resources of the computing rack 112-1. Each node of nodes 1, 2, 3, 4 may be one of the composed-nodes 511(1) to 511(n). Accordingly, each of the nodes 1, 2, 3, 4 utilizes a respective portion of the resources of the combined pooled compute enclosure 124', the pooled storage enclosure 136, and the pooled network enclosure 142. Further, the request may indicate that one or more of the nodes 1, 2, 3, 4 are critical nodes. In certain configurations, the indication also specifies that a particular critical node is to have a backup node of the same rack or a different rack. When the backup node is on a different rack, the indication may also specify when the two racks are at the same geolocation or at different geolocations.

The node-composing component 504 generates a data object for building a particular critical node and sends the generated data object to the resource manager 401. Accordingly, the resource manager 401 allocates resources of the computing racks 112-1 to 112-k to build the particular critical node (e.g., one of the nodes 1, 2, 3, 4).

Further, the data object received by the resource manager 401 may specify an OS and service components to be installed on the particular critical node. Accordingly, the node configuration component 507 of the pod manager 178 further configures the critical node to install the OS and the service components. In particular, the node configuration component 507 may install a boot agent on the particular critical node. The boot agent on the particular critical node is configured by the node configuration component 507 to download the OS and the service components from the PXE server 509 to the critical node and to install and initiate the OS and the service components. For example, the OS may be a LINUX® OS and the service components may be a MYSQL® server.

In this example, the node 1 and the node 4 are critical nodes. The node-composing component 504 sends the indications to the node configuration component 507. In a first configuration, the indications also indicate that backup nodes are to be built in the same rack. Accordingly, the node configuration component 507 further reserves resources, from the same rack of a corresponding critical node, for a backup node of each of the corresponding critical node.

In one technique, the node configuration component 507 allocates resources required for building a backup node of the node 1 (i.e., backup node 1) from the combined pooled compute enclosure 124', the pooled storage enclosure 136, and the pooled network enclosure 142. The backup node 1 may contain the same hardware elements as the node 1. For example, the node 1 and the backup node 1 may employs the same configurations of CPUs, memories, storage spaces, etc. Similarly, the node configuration component 507 also allocates resources required for building a backup node of the node 4 (i.e., backup node 4) from the combined pooled compute enclosure 124', the pooled storage enclosure 136, and the pooled network enclosure 142.

In another technique, the node configuration component 507 allocates resources from the combined pooled compute enclosure 124' and the pooled network enclosure 142 for building the backup node 1. The backup node 1 shares the same resources from the pooled storage enclosure 136 with the node 1. Therefore, in the techniques described infra, the resource manager 401 uses the reserved resources from the combined pooled compute enclosure 124' and the pooled network enclosure 142 as well as the resources in the pooled storage enclosure 136 employed by the node 1 to build the backup node 1.

In yet another technique, the node configuration component 507 only reserves the minimum resource required for building the backup node 1 and the backup node 4. For example, the node 1 may employs 8 CPUs for providing the functionalities in a high-performance setting. In contrast, only 4 CPUs are reserved for the backup node 1, which when executed will provide the functionalities in a low performance setting.

The node-composing component 504 monitors the operation conditions of the critical nodes (e.g., the node 1 and the node 4). Each of the critical nodes may send alert signals to the node-composing component 504 when any component of that critical node fails or is non-operative. Further, each of the critical nodes may periodically send a health signal to the node-composing component 504 when that critical node is operating normally as expected. When the node-composing component 504 detects the presence of an alert signal or the absence of a health signal from any particular one of the critical nodes, the node-composing component 504 determines that the particular critical node has failed. In response, the node-composing component 504 may initiate a procedure to build a backup node to replace the failed critical node.

In this example, the node-composing component 504 may detect that the node 1 has failed. In response, the node-composing component 504 may retrieve from the node configuration component 507 information of resources reserved for the backup node 1.

The node-composing component 504 generates a data object for building the backup node 1 and sends the generated data object to the resource manager 401. The data object specifies the resources reserved for the backup node 1 as well as the OS and the service components, which are the same as the OS and service components of the node 1, to be installed on the backup node 1. Accordingly, the resource manager 401 builds the backup node 1 with the corresponding reserved resources. As the reserved resources contain at least the minimum required hardware elements for the backup node 1 providing the functionalities of the node 1, the backup node 1 can be built with those resources. Further, the node configuration component 507 configures the critical node to install the OS and the service components, similar to what was described supra regarding the node 1. Subsequently, the backup node 1 is initiated to replace the node 1. As such, the functionalities of the node 1 are provided by the backup node 1. Further, the failed node 1 may be decomposed and the resources of the computing rack 112-1 allocated to the node 1 may be returned to the pools. When the node 4 fails, the backup node 5 on the computing rack 112-1 can be similarly built and activated.

Figure 8:
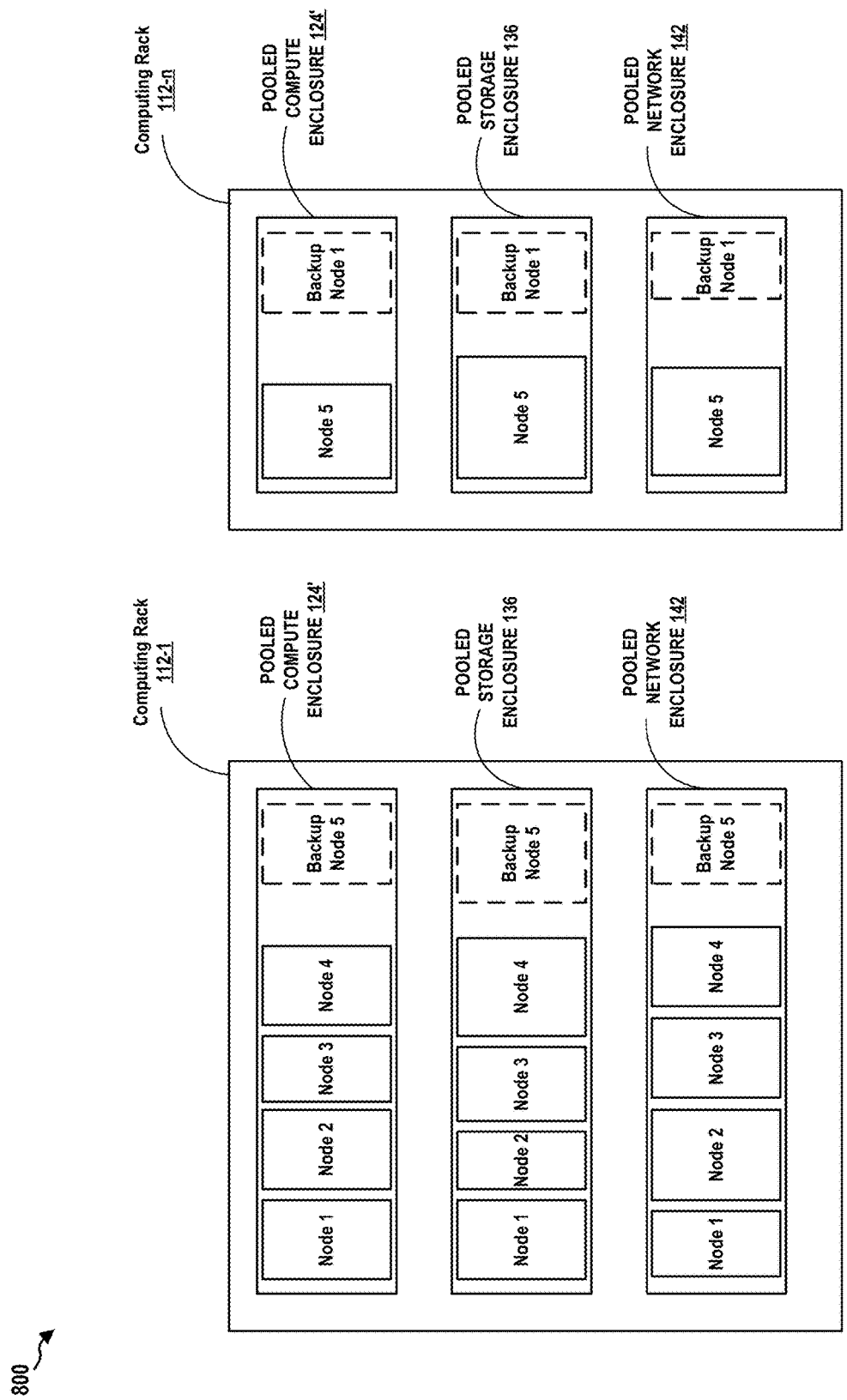
FIG. 8 is diagram illustrating another node recovery technique.

FIG. 8 is a diagram illustrating a node recovery technique. In this example, the node-composing component 504 may, in response to received requests, composes nodes 1, 2, 3, 4 using resources of the computing rack 112-1 and node 5 using resources of the computing rack 112-n. Accordingly, each of the nodes 1, 2, 3, 4 utilizes a respective portion of the resources of the combined pooled compute enclosure 124', the pooled storage enclosure 136, and the pooled network enclosure 142 of the computing rack 112-1. The node 5 utilizes a respective portion of the resources of the combined pooled compute enclosure 124', the pooled storage enclosure 136, and the pooled network enclosure 142 of the computing rack 112-n.

Further, in this example, the requests may indicate that the node 1 and the node 5 are critical nodes and specifies that the node 1 and the node 5 are to have a backup node of a different rack. The indication may also specify when the two racks are at the same geolocation or at different geolocations.

The node-composing component 504 generates data objects for building the node 1 and the node 5 and sends the generated data object to the resource manager 401. Accordingly, the resource manager 401 allocates resources of the computing rack 112-1 to build the node 1 and resources of the computing rack 112-n to build the node 5.

When the requests indicate that the rack of the backup nodes is at the same geolocation, the resource manager 401 accordingly selects the computing rack 112-1 and the computing rack 112-n are at the same geolocation. For example, the computing rack 112-1 and the computing rack 112-n can be in the same data center at the same physical location. When the requests indicate that the rack of the backup nodes is at the different geolocation, the resource manager 401 accordingly selects the computing rack 112-1 and the computing rack 112-n from different geolocation. For example, the computing rack 112-1 and the computing rack 112-n can be in the different data centers at the different physical locations.

In this example, the node-composing component 504 sends the indications to the node configuration component 507 that the node 1 and the node 5 are critical nodes. The indications also indicate that backup nodes are to be built on a different rack. Accordingly, with respect to node 1, the node configuration component 507 further reserves resources, from a rack of that is different from the computing rack 112-1 containing the node 1, for a backup node of the node 1. In this example, based on the rack resources available, the node configuration component 507 selects the computing rack 112-n. In particular, the node configuration component 507 allocates resources required for building a backup node of the node 1 (i.e., backup node 1) from the combined pooled compute enclosure 124', the pooled storage enclosure 136, and the pooled network enclosure 142 on the computing rack 112-n. In one technique, the backup node 1 may contain the same hardware elements as the node 1. For example, the node 1 and the backup node 1 may employs the same configurations of CPUs, memories, storage spaces, etc. In another technique, the node configuration component 507 only reserves the minimum resource required for building the backup node 1.

Similarly, in this example, the node configuration component 507 builds the node 5 on the computing rack 112-n according to the request. Further, the node configuration component 507 can allocates resources required for building a backup node of the node 5 (i.e., backup node 5) from the combined pooled compute enclosure 124', the pooled storage enclosure 136, and the pooled network enclosure 142 on the computing rack 112-n.

The node-composing component 504 monitors the operation conditions of the node 1 and the node 5. Each of the node 1 and the node 5 may send alert signals to the node-composing component 504 when any component of that critical node fails or is non-operative. Further, each of the critical nodes may periodically send a health signal to the node-composing component 504 when that critical node is operating normally as expected. When the node-composing component 504 detects the presence of an alert signal or the absence of a health signal from any particular one of the critical nodes, the node-composing component 504 determines that the particular critical node has failed. In response, the node-composing component 504 may initiate a procedure to build a backup node to replace the failed critical node.

In this example, the node-composing component 504 may detect that the node 1 has failed. In response, the node-composing component 504 may retrieve from the node configuration component 507 information of resources reserved for the backup node 1.

The node-composing component 504 generates a data object for building the backup node 1 and sends the generated data object to the resource manager 401. The data object specifies the resources reserved for the backup node 1 as well as the OS and the service components, which are the same as the OS and service components of the node 1, to be installed on the backup node 1. In this example, those resources are reserved on the computing rack 112-n for the backup node 1. Accordingly, the resource manager 401 builds the backup node 1 with the corresponding reserved resources.

As the reserved resources contain at least the minimum required hardware elements for the backup node 1 providing the functionalities of the node 1, the backup node 1 can be built with those resources. Further, the node configuration component 507 configures the backup node 1 to install the OS and the service components, similar to what was described supra regarding the node 1. Subsequently, the backup node 1 is initiated to replace the node 1. As such, the functionalities of the node 1 are provided by the backup node 1. Further, the failed node 1 may be decomposed and the resources of the computing rack 112-1 allocated to the node 1 may be returned to the pools. When the node 5 on the computing rack 112-n fails, the backup node 5 on the computing rack 112-1 can be similarly built and activated.

Figure 9:
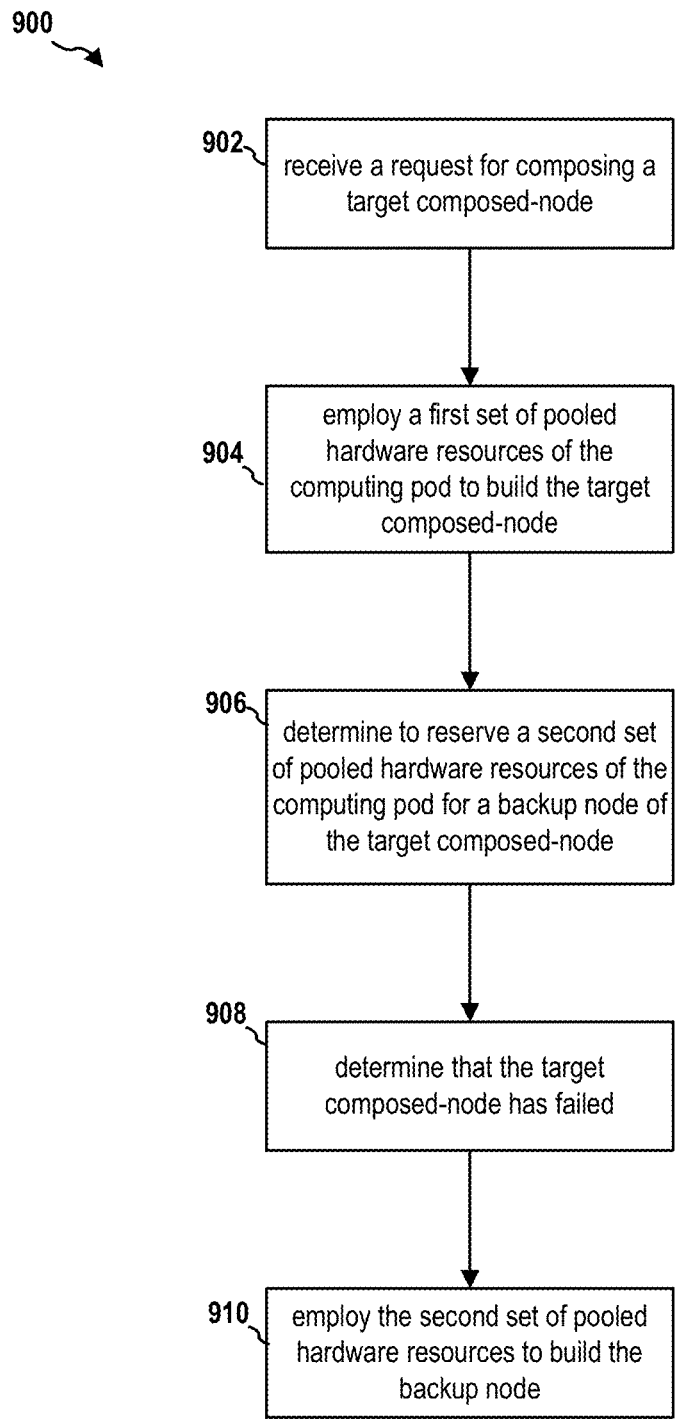
FIG. 9 is a flow chart of a method (process) for building a backup node.

FIG. 9 is a flow chart 900 of a method (process) for building a backup node. The method may be performed by a pod manager (e.g., the pod manager 178 and the apparatus 178'). In certain configurations, at operation 902, the pod manager receives a request for composing a target composed-node. At operation 904, the pod manager employs a first set of pooled hardware resources of the computing pod to build the target composed-node. At operation 906, the pod manager determines to reserve a second set of pooled hardware resources of the computing pod for a backup node of the target composed-node. At operation 908, the pod manager determines that the target composed-node has failed. At operation 910, the pod manager employs the second set of pooled hardware resources to build the backup node.

In certain configurations, the second set of pooled hardware resources contains less hardware resources than the first set of pooled hardware resources. In certain configurations, the target composed-node and the backup node have a same software configuration to provide a same service. In certain configurations, the first set of pooled hardware resources and the second set of pooled hardware resources are on a same computing rack of the computing pod. In certain configurations, the first set of pooled hardware resources and the second set of pooled hardware resources are on different computing racks of the computing pod.

In certain configurations, the first set of pooled hardware resources and the second set of pooled hardware resources each include: respective pooled compute resources, respective pooled network resources, and respective pooled storage resources. In certain configurations, the first set of pooled hardware resources includes first pooled compute resources, first pooled network resources, and first pooled storage resources. The first set of pooled hardware resources includes second pooled compute resources, and second pooled network resources.

Figure 10:
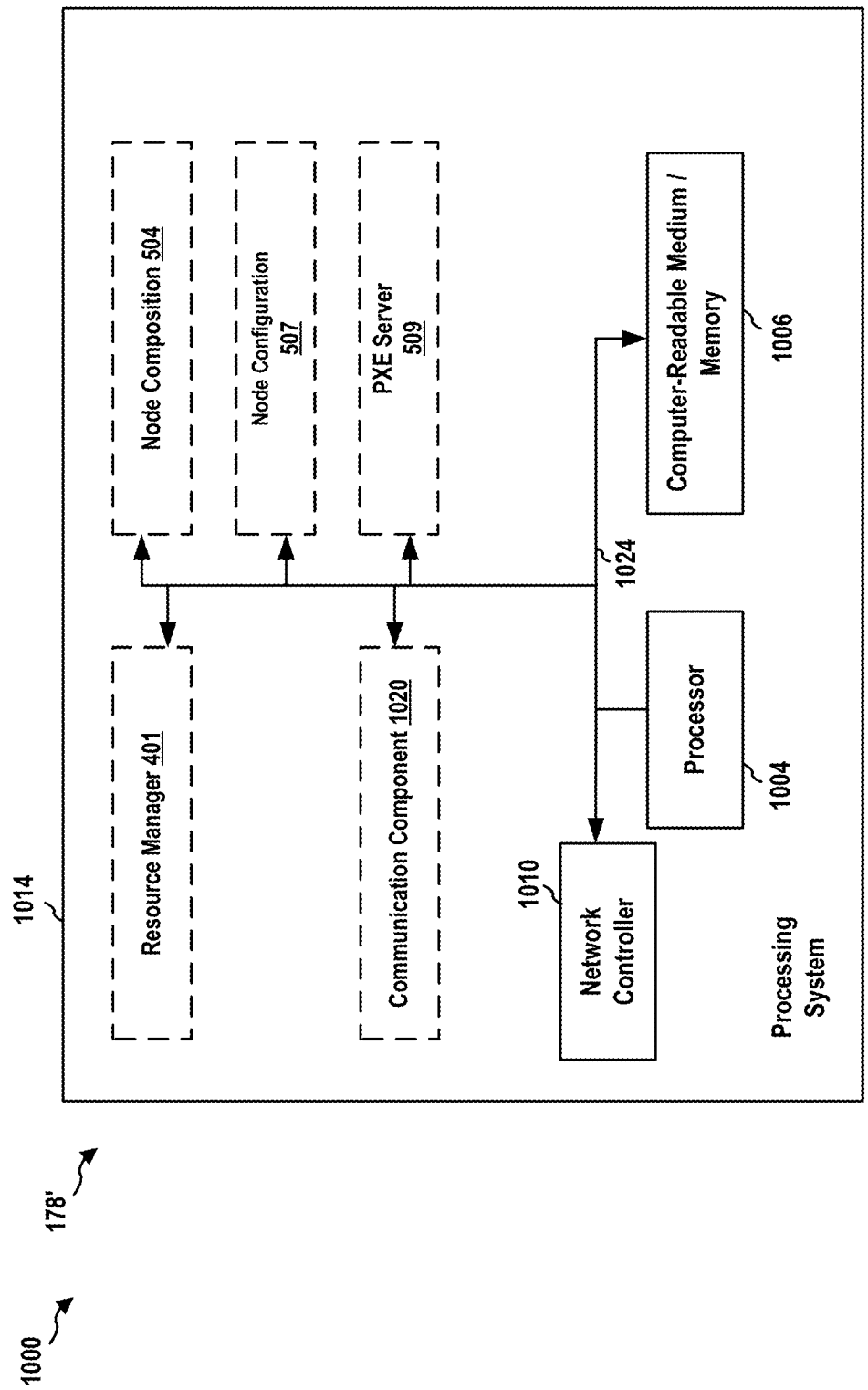
FIG. 10 is a diagram illustrating an example of a hardware implementation for an apparatus.

FIG. 10 is a diagram 1000 illustrating an example of a hardware implementation for an apparatus 178' employing a processing system 1014. The apparatus 178' may implement the pod manager 178. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by a processor 1004, a network controller 1010, and a computer-readable medium/memory 1006. In particular, the computer-readable medium/memory 1006 may include the memory 114 and the storage 117. The bus 1024 may also link various other circuits such as timing sources, peripherals, voltage regulators, and power management circuits, which are well known in the art, and therefore, will not be described any further.

The processing system 1014 may be coupled to the network controller 1010. The network controller 1010 provides a means for communicating with various other apparatus over a network. The network controller 1010 receives a signal from the network, extracts information from the received signal, and provides the extracted information to the processing system 1014, specifically a communication component 1020 of the apparatus 178'. In addition, the network controller 1010 receives information from the processing system 1014, specifically the communication component 1020, and based on the received information, generates a signal to be sent to the network. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system further includes at least one of the resource manager 401, the node-composing component 504, the node configuration component 507, and the PXE server 509. The components may be software components running in the processor 1004, resident/stored in the computer readable medium/memory 1006, one or more hardware components coupled to the processor 1004, or some combination thereof.

The apparatus 178' may be configured to include means for performing operations described supra referring to FIG. 9. The aforementioned means may be one or more of the aforementioned components of the apparatus 178 and/or the processing system 1014 of the apparatus 178' configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of managing composed-nodes of a computing pod, comprising:

receiving a request for composing a target composed-node running one or more virtual machines (VMs);
employing a first set of pooled hardware resources of the computing pod to build the target composed-node running the one or more VMs;
determining whether the target composed-node is a critical node;
when the target composed-node is a critical node, reserving a second set of pooled hardware resources of the computing pod for building a backup node, of the target composed-node, that runs the one or more VMs, wherein the first set and second set of pooled hardware resources each are physical hardware components, wherein the first set of pooled hardware resources and the second set of pooled hardware resources are on same computing racks of the computing pod;
determining that the target composed-node has failed;
determining software components of the target composed-node; and
connecting the second set of pooled hardware resources through communication links, including bus links, to build the backup node running the one or more VMs, including installing the software components on the second set of pooled hardware resources.

2. The method of claim 1, wherein the second set of pooled hardware resources contains less hardware resources than the first set of pooled hardware resources.

3. The method of claim 1, wherein the target composed-node and the backup node have a same software configuration to provide a same service.

4. The method of claim 1, wherein the first set of pooled hardware resources and the second set of pooled hardware resources each include: respective pooled compute resources, respective pooled network resources, and respective pooled storage resources.

5. The method of claim 1, wherein the first set of pooled hardware resources includes first pooled compute resources, first pooled network resources, and first pooled storage resources; wherein the first set of pooled hardware resources includes second pooled compute resources, and second pooled network resources;
wherein the backup node is built by further employing the first pooled storage resources.

6. An apparatus for managing composed-nodes of a computing pod, comprising: a memory; and
at least one processor coupled to the memory and configured to:
receive a request for composing a target composed-node running one or more virtual machines (VMs);
employ a first set of pooled hardware resources of the computing pod to build the target composed-node running the one or more VMs;
determine whether the target composed-node is a critical node;
when the target composed-node is a critical node, reserve a second set of pooled hardware resources of the computing pod for building a backup node, of the target composed-node, that runs the one or more VMs, wherein the first set and second set of pooled hardware resources each are physical hardware components, wherein the first set of pooled hardware resources and the second set of pooled hardware resources are on same computing racks of the computing pod;
determine that the target composed-node has failed;
determine software components of the target composed-node; and
connect the second set of pooled hardware resources through communication links, including bus links, to build the backup node running the one or more VMs and install the software components on the second set of pooled hardware resources.

7. The apparatus of claim 6, wherein the second set of pooled hardware resources contains less hardware resources than the first set of pooled hardware resources.

8. The apparatus of claim 6, wherein the target composed-node and the backup node have a same software configuration to provide a same service.

9. The apparatus of claim 6, wherein the first set of pooled hardware resources and the second set of pooled hardware resources each include: respective pooled compute resources, respective pooled network resources, and respective pooled storage resources.

10. The apparatus of claim 6, wherein the first set of pooled hardware resources includes first pooled compute resources, first pooled network resources, and first pooled storage resources;
wherein the first set of pooled hardware resources includes second pooled compute resources, and second pooled network resources;
wherein the backup node is built by further employing the first pooled storage resources.

11. A non-transitory computer-readable medium storing computer executable code for managing composed-nodes of a computing pod, comprising code to:
receive a request for composing a target composed-node running one or more virtual machines (VMs);
employ a first set of pooled hardware resources of the computing pod to build the target composed-node running the one or more VMs;
determine whether the target composed-node is a critical node;
when the target composed-node is a critical node, reserve a second set of pooled hardware resources of the computing pod for building a backup node, of the target composed-node, that runs the one or more VMs, wherein the first set and second set of pooled hardware resources each are physical hardware components, wherein the first set of pooled hardware resources and the second set of pooled hardware resources are on same computing racks of the computing pod;
determine that the target composed-node has failed;
determine software components of the target composed-node; and
connect the second set of pooled hardware resources through communication links, including bus links, to build the backup node running the one or more VMs and install the software components on the second set of pooled hardware resources.

12. The non-transitory computer-readable medium of claim 11, wherein the second set of pooled hardware resources contains less hardware resources than the first set of pooled hardware resources.

13. The non-transitory computer-readable medium of claim 11, wherein the target composed-node and the backup node have a same software configuration to provide a same service.

14. The non-transitory computer-readable medium of claim 11, wherein the first set of pooled hardware resources and the second set of pooled hardware resources each include: respective pooled compute resources, respective pooled network resources, and respective pooled storage resources.

* * * * *